April 30, 1963  W. C. RIESTER  3,087,681
WINDSHIELD WASHER
Filed Aug. 4, 1961
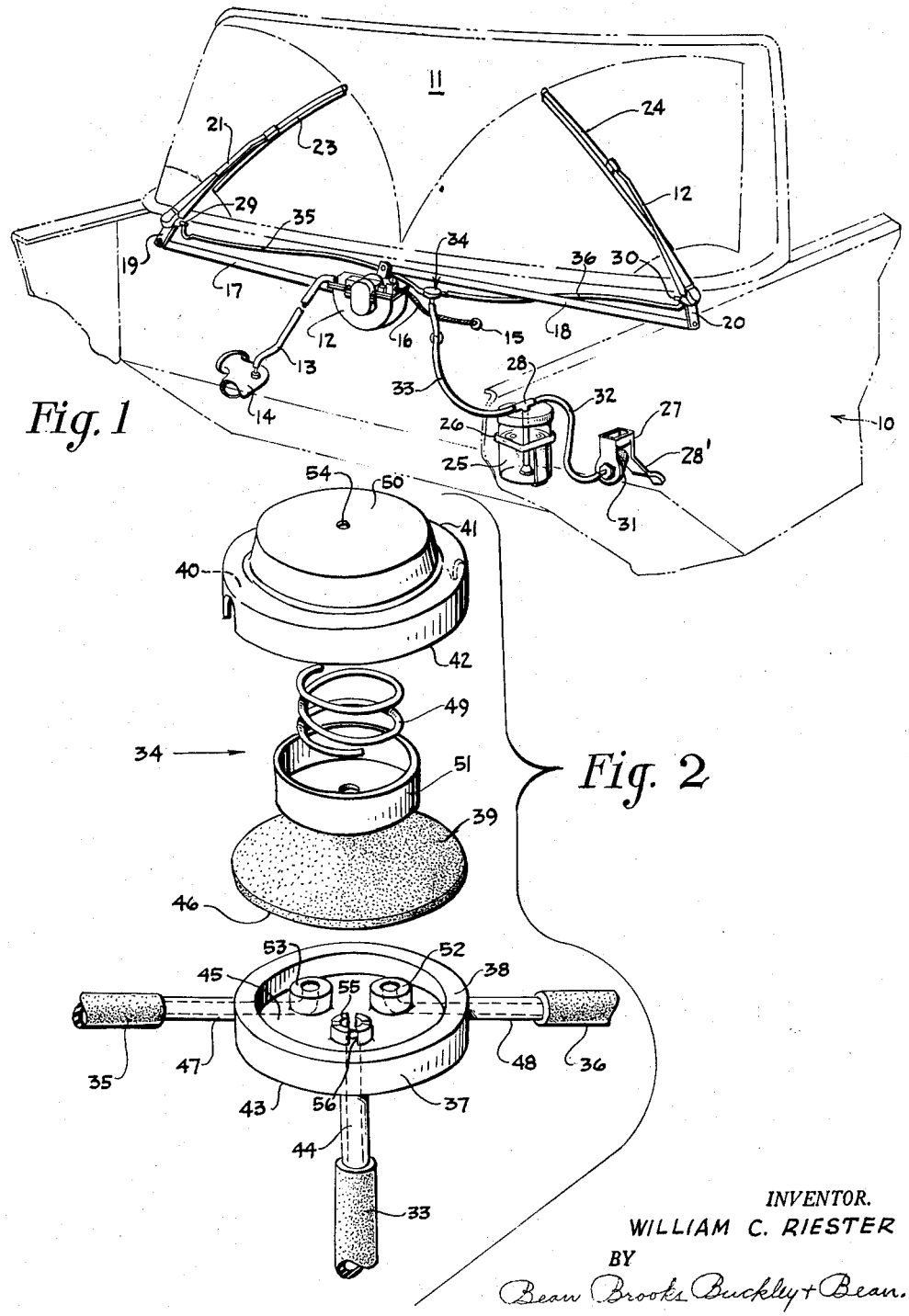
INVENTOR.
WILLIAM C. RIESTER
BY
Bean Brooks Buckley + Bean.
ATTORNEYS

United States Patent Office 3,087,681
Patented Apr. 30, 1963

3,087,681
WINDSHIELD WASHER
William C. Riester, Williamsville, N.Y., assignor to Trico Products Corporation, Buffalo, N.Y.
Filed Aug. 4, 1961, Ser. No. 129,369
7 Claims. (Cl. 239—284)

The present invention relates to an improved windshield washer system for an automotive vehicle and more specifically to an anti-spill valve to be used in conjunction therewith.

In the conventional windshield washer arrangement for supplying cleaning solvent to a windshield of a vehicle, a pump is provided for transmitting cleaning solvent to a nozzle adjacent the lower edge of a windshield through a conduit arrangement. After the pumping action is completed, a residual amount of cleaning solvent may remain in said conduit. Frequently when a vehicle travels over rough roads or turns a corner, this residual solvent in the conduit may be expelled from the nozzle by the action of centrifugal forces and thereby distract the vehicle operator. In other washer installations the above problem does not occur because the looseness of the various valves in the washer system permits the solvent in the above-mentioned conduit to drain back into the solvent reservoir of the washer system. When such a system is actuated, there is no immediate projection of solvent onto a windshield because the empty conduit leading to the nozzle must first be filled. It is with the overcoming of the foregoing shortcomings prevalent in prior washer systems that the present invention is concerned.

It is accordingly the primary object of the present invention to provide a washer system having an anti-spill and anti-drain back valve therein which prevents cleaning solvent in the conduit leading to the nozzle both from draining back into the system reservoir and also prevents such residual solvent which is retained in the conduit leading to the nozzle from inadvertently splashing the vehicle windshield when the vehicle is driven over rough roads or around corners.

It is another object of the present invention to provide an anti-spill valve for a vehicle windshield cleaning system which can be incorporated into existing systems to prevent inadvertent splashing of the vehicle windshield when the vehicle is driven over rough roads or around corners, and which also prevents the conduits leading to the solvent projecting nozzles from draining back into the solvent reservoir, thereby assuring instantaneous solvent projection onto a windshield when the washer system is actuated. Other objects and attendant advantages of the present invention will readily be perceived hereafter.

The washer system of the present invention includes an anti-spill valve located in the conduit extending between the washer pump and the washer nozzles located adjacent the lower edge of the windshield. The anti-spill valve includes a chamber having a first conduit in communication therewith, said first conduit being in a communication with the washer pump. A flexible member, such as a resilient diaphragm, forms a wall of said chamber. When pressurized fluid exists in said chamber, the flexible diaphragm is deflected to thereby terminate its seating engagement with the end of a second conduit which leads to the above mentioned washer nozzles. Thus when the washer pump is actuated, solvent may travel from said first conduit into said second conduit through said chamber. After the pressure in said chamber is dissipated at the conclusion of a windshield washing operation, the flexible diaphragm seats on said seat of said second conduit and provides a fluid tight seal therewith. This prevents solvent in said second conduit from draining back into said chamber and also prevents solvent in said conduit from being expelled from the nozzles by the action of centrifugal forces. It is to be especially noted that the area of said flexible diaphragm which is in communication with said chamber is greater than the portion thereof which seals said second conduit. Thus the unit pressure in said first conduit and therefore in said chamber, which is required to unseat said diaphragm from said second conduit, is relatively small. However, since the area of said flexible diaphragm which seats on said second conduit is relatively small, good sealing contact with said second conduit will be assured. Furthermore, the anti-spill valve of the present invention can be installed in existing washer systems instead of the T which is normally located between the single line leading from the washer pump and each of the lines leading to the two washer nozzles. The present invention will be more fully understood when the following portions of the specification are read in conjunction with the accompanying drawing wherein:

FIG. 1 is a fragmentary perspective view of an automotive vehicle mounting the improved washer system of the present invention; and FIG. 2 is a perspective exploded view of the various components of the anti-spill valve.

In FIG. 1 vehicle 10 has a windshield 11 mounted thereon in the conventional manner. Secured to the firewall of the vehicle is a wiper motor 12 to which is coupled one end of a hose 13, the other end of which is in communication with the engine intake manifold 14. A suitable control 15 is mounted on the vehicle dashboard and connected to the motor through a Bowden cable 16. Links 17 and 18 have their inner ends connected to the output shaft of the motor and transmit motion to crankarms 19 and 20, respectively, which in turn mount rockshafts (not shown). Wiper arms 21 and 22 are mounted on the rockshafts and in turn carry wipers 23 and 24, respectively. The foregoing wiper system operates in the conventional manner.

In order to project cleaning solvent onto the windshield, a washer system is provided. In its simplest form the washer system includes a reservoir 25 which is secured to bracket 26. A washer pump 27 of the foot-operated type is mounted on the inside of the firewall for access by the vehicle operator. A check valve arrangement 28 is mounted on the reservoir 25 and contains a double check valve therein for the purpose of permitting solvent to be withdrawn from the reservoir by the expansion of the foot pump 27 and for permitting this solvent to be discharged when lever 28' of the foot pump is depressed. The discharge occurs through nozzles 29 and 30 which are mounted underneath the windshield, the nozzles being in communication with pump bellows 31 through conduits 32, 33, anti-spill valve 34, and conduits 35 and 36. The washer system may be of any conventional type known in the art and may include features such as shown in United States Patent No. 2,743,473.

The anti-spill valve 34 is shown in exploded form in FIG. 2. This valve permits windshield solvent to pass therethrough from conduit 33 into conduits 35 and 36 which lead to nozzles 29 and 30, respectively. As noted above, the anti-spill valve prevents residual solvent which remains in conduits 35 and 36 after the termination of a windshield washing operation from draining back into reservoir 25 in the event that the check valves at 28 are for some reason loose, and also prevents such residual solvent from being discharged from nozzles 29 and 30 when the vehicle is jarred or is in the process of making a turn.

Anti-spill valve 34 includes a cast base 37 having a shoulder 38 thereon. A flexible diaphragm 39 having an outer diameter substantially of the outer diameter or dimension of shoulder 38, has one side thereof in contact with shoulder 38 and the other side thereof in sealing engagement with the shoulder 40 formed on the inside of cap 41. The bottom edge 42 of cap 41 is crimped about the undersurface 43 of base 37 when the cap and base are in engagement. The fit between shoulders 40 and 38 is sufficiently tight so that the outer peripheral portion of flexible diaphragm 39 acts as a seal therebetween. Conduit 33 leading from the washer pump fits onto conduit or nipple 44 which is in communication with chamber 45 in the anti-spill valve 34. One wall of chamber 45 is the underside 46 of diaphragm 39. Conduits 35 and 36 leading to nozzles 29 and 30, respectively, are mounted on conduits 47 and 48, respectively, which are formed integrally with base 37. A spring 49 is interposed between the underside of the top 50 of the anti-spill valve and a pressure distributing member or cap 51, the undersurface of which bears on diaphragm 39 to cause said diaphragm to remain in good sealing relationship with seats 52 and 53 formed at the terminal portions of conduits 48 and 47, respectively, when the washer pump is not being actuated. A vent 54 is provided in cap 41 to permit unrestricted movement of diaphragm 39.

It will readily be appreciated that whenever the washer pump is actuated, chamber 45 will be filled with pressurized solvent and the latter will move upwardly against the bias of spring 49 when the unit pressure of the solvent is relatively low because this unit pressure is applied to substantially the entire undersurface 46 of diaphragm 39, in view of the fact that the end 55 of conduit 44 is split at 56 to permit the pressure in conduit 33 to be distributed substantially along the entire undersurface 46 of diaphragm 39. When diaphragm 39 is deflected upwardly by such pressure, it will move away from seats 52 and 53 to permit the solvent to pass from conduit 33 into conduits 35 and 36 leading to the washer nozzles through chamber 45.

However, after the pump operation has terminated, spring 49 will expand and cause a portion of the undersurface 46 to become firmly seated on the seats 53 and 52 in chamber 45. It will be noted that a relatively small area of the diaphragm 39 is in contact with seats 52 and 53, thereby providing a good seal under the urging of spring 49 and cap 51 upon which spring 49 bears. Because of this good seal, the residual solvent remaining in conduits 35 and 36 after washer operation will not bleed back into conduit 33 leading to the reservoir, nor will it permit such residual solvent to be ejected from nozzles 29 and 30 because of the jarring of the vehicle or because of the centrifugal force experienced by the fluid when the vehicle is turning around the corner.

While a preferred embodiment of the present invention has been disclosed, it will be readily understood that the present invention is not limited thereto, but may be otherwise embodied within the scope of the following claims.

What is claimed is:

1. A windshield washer system comprising a reservoir for solvent, a pump in communication with said reservoir, a plurality of nozzles, an anti-spill valve assembly including a chamber, conduit means for effecting communication between said reservoir and said chamber, a plurality of conduits, each of said conduits connecting one of said nozzles within said anti-spill valve assembly and terminating at one end within said chamber, said conduit means and said conduits being in communication with each other through said chamber when said pump is actuated to pressurize said conduit means and means in said chamber for interrupting communication between each of said conduits and said conduit means and for sealing said terminating ends of each of said conduits when said conduit means is no longer pressurized.

2. A windshield washer anti-spill valve comprising a housing, a chamber in said housing, a first conduit in communication with said chamber, a sealing member resiliently mounted in said chamber, said sealing member having an area acted upon by fluid in said chamber and a plurality of other conduits, each of said other conduits providing at one end exterior communication from said anti-spill valve and adapted to be engaged at its other end by said sealing member whereby the existence of pressurized fluid in said first conduit unseals said sealing member from said other conduits to permit passage of fluid from said first conduit into said other conduits through said chamber and the sealing of said sealing member seals said other end of each of said conduit members from each other and from said chamber when pressurized fluid no longer exists in said first conduit to thereby prevent said fluid from flowing from said other conduits into said chamber and to prevent said cleaning solvent from being expelled from the exterior end of said other conduits in response to the action of centrifugal force on the fluid in said other conduits.

3. A windshield washer anti-spill valve comprising a housing having a base portion and a cap portion, a first sealing shoulder on said base portion, a second sealing shoulder on said cap portion in overlying relationship with respect to said first sealing shoulder, a flexible member having a first portion interposed between said first and second sealing shoulders to provide a fluid tight connection between said first and second shoulders, a hollow portion in said base member for defining a chamber in conjunction with a second portion of said flexible member, a first conduit in communication with said chamber whereby a pressurized fluid in said first conduit causes deflection of said flexible member, other conduits in said base member, each terminating in a seat within said chamber adapted to have sealing engagement with another portion of said flexible member, the existence of said pressurized fluid in said first conduit unseating said flexible member from each of said seats on said other conduits to permit communication between said first and said other conduits through said chamber, and said flexible member seating on said seat of each of said other conduits to seal said other conduits from each other and from said chamber and to prevent each of said other conduits from being vented when pressurized fluid no longer exists in said chamber to thereby both prevent residual liquid in said other conduits from draining into said chamber and also to prevent said residual liquid in said other conduits from being expelled from the end of said other conduits which is remote from said seats by the action of centrifugal forces.

4. A windshield washer anti-spill valve as set forth in claim 3 including spring means interposed between said cap portion and said flexible member for insuring good sealing contact between said flexible member and said seat of said second conduit.

5. A windshield washer anti-spill valve as set forth in claim 4 including pressure equalizing means interposed between said spring means and said flexible member for distributing the force of said spring means to said flexible member.

6. A windshield washer anti-spill valve as set forth in claim 5 wherein said flexible member comprises a resilient diaphragm.

7. A washer system for a vehicle windshield comprising a reservoir for solvent, a pump in communication with said reservoir, first and second spaced nozzles mounted proximate said windshield, an anti-spill valve assembly including a chamber, conduit means for effecting communication between said pump and said chamber, a first conduit for effecting communication between said anti-spill valve and said first nozzle, a second conduit for effecting communication between said anti-spill valve and said second nozzle, said anti-spill valve having check valve means located in said chamber for selectively permitting communication between said conduit means and said first and second conduits when said pump is in operation and for sealing said first and second conduits to prevent said first and second conduits from being vented when said pump is not in operation, whereby pressurized solvent in said conduit means unseats said check valve from sealing relationship with said first and second conduits to permit communication between said conduit means and said first and second conduits when said washer pump is actuated and whereby said check valve means seals said first and second conduits from said conduit means and from each other after said solvent is no longer pressurized to thereby prevent said solvent in said first and second conduits from bleeding back into said conduit means and whereby said sealing of said uninterrupted first and second conduits from each other by said check valve means also prevents said solvent in said first and second conduits from being expelled from said nozzle onto said windshield due to centrifugal forces acting on the solvent therein.

References Cited in the file of this patent
UNITED STATES PATENTS

| | | |
|---|---|---|
| 2,169,052 | Lindsey | Aug. 8, 1939 |
| 2,629,399 | Kulick | Feb. 24, 1953 |
| 2,926,693 | Ziegler | Mar. 1, 1960 |
| 2,962,223 | Partridge | Nov. 29, 1960 |